United States Patent [19]

Earnhardt et al.

[11] 4,208,772
[45] Jun. 24, 1980

[54] AUTOMATIC METAL WORKING MACHINE PART COUNTER

[75] Inventors: Daniel E. Earnhardt; Robert L. Hogeman, both of Rochester, N.Y.

[73] Assignee: General Motors Corporation, Detroit, Mich.

[21] Appl. No.: 958,245

[22] Filed: Nov. 6, 1978

[51] Int. Cl.² .......................... B23B 9/04; B23B 13/12
[52] U.S. Cl. ..................................... 29/37 R; 29/65; 82/2.5; 82/3; 82/34 A
[58] Field of Search ................. 29/27 C, 37 R, 37 A, 29/38 R, 38 A, 38 B, 38 C, 43, 65; 82/2.5, 2.7, 3, 34 A

[56] References Cited

U.S. PATENT DOCUMENTS

| 2,425,124 | 8/1947 | Ray ............................. 29/37 R X |
| 2,844,315 | 7/1958 | Zelinsky ...................... 29/37 R X |
| 3,372,449 | 3/1968 | Jamison ....................... 29/37 R |

Primary Examiner—Z. R. Bilinsky
Attorney, Agent, or Firm—R. L. Phillips

[57] ABSTRACT

A multiple spindle automatic screw machine is provided with an electrically insulated metal stock feed stop which is connected in an electrical circuit so as to provide an electrical signal when the grounded bar stock makes contact therewith for indicating part count and stock presence.

2 Claims, 5 Drawing Figures

AUTOMATIC METAL WORKING MACHINE PART COUNTER

This invention relates to an automatic metal working machine part counter and more particularly to such a device wherein the part count is sensed at the machine's stock feed stop.

In automatic metal working machines which are capable of producing a large number of parts in a very short time, there are substantial difficulties in obtaining an accurate part count. For example, in multiple spindle automatic screw machines there are a number of conditions associated with the machine such as vibration, coolant and air flow, metal cuttings, elevated temperatures, stock size variation and limited space which make it difficult to incorporate a reliable, inexpensive counter. Many part counting devices and methods have been tried on such machines over a period of many years but have generally been found lacking because they either require extensive calibration and/or are not reliable or are expensive. Those part count devices well known in the art and over which the present invention represents a substantial improvement include pneumatic, induction coil, acoustical and electric current draw monitoring sensors, accelerometers, infrared detectors, and photoelectric eyes. On the other hand, an off-machine method of part counting such as weighing has generally proven unsatisfactory because of floor space limitations, the high cost of a weigh station for each machine and the necessity of accounting for scrap and coolant weight. In addition, count has been taken of the bar stock to deduce the number of parts machined but this is dependent on the accuracy of the machine operators or assistants and requires calculation for each different part.

The present invention overcomes these difficulties with a simple, reliable, and inexpensive part counter which is readily adaptable to automatic metal working machines having a stock feed stop. The part counter comprises a clock counter and a circuit for operating same that includes a switch having a groundable operating terminal which is connected to a metal stock feed stop plate in the machine and operates the switch when grounded to effect a count. The metal stock feed stop plate instead of being normally grounded in the machine is rigidly insulated therefrom so that when the bar stock which is normally grounded in the machine is stopped thereby there is thus effected grounding contact of the switch terminal to effect the part count while precise stoppage is maintained. Thus, no extensive calibration is required and the device is readily capable of coping with the environments in such machines.

An object of the present invention is to provide a new and improved automatic metal working machine part counter.

Another object is to provide in an automatic metal working machine, a part counter employing a metal stock feed stop which is rigidly insulated from the machine and is effective on engagement by the work stock to ground a circuit to effect a part count.

Another object is to provide a simple, reliable and inexpensive part counter adapted to be installed in an automatic metal working machine.

These and other objects of the present invention will be more apparent from the following description and drawings in which.

Figure 1:
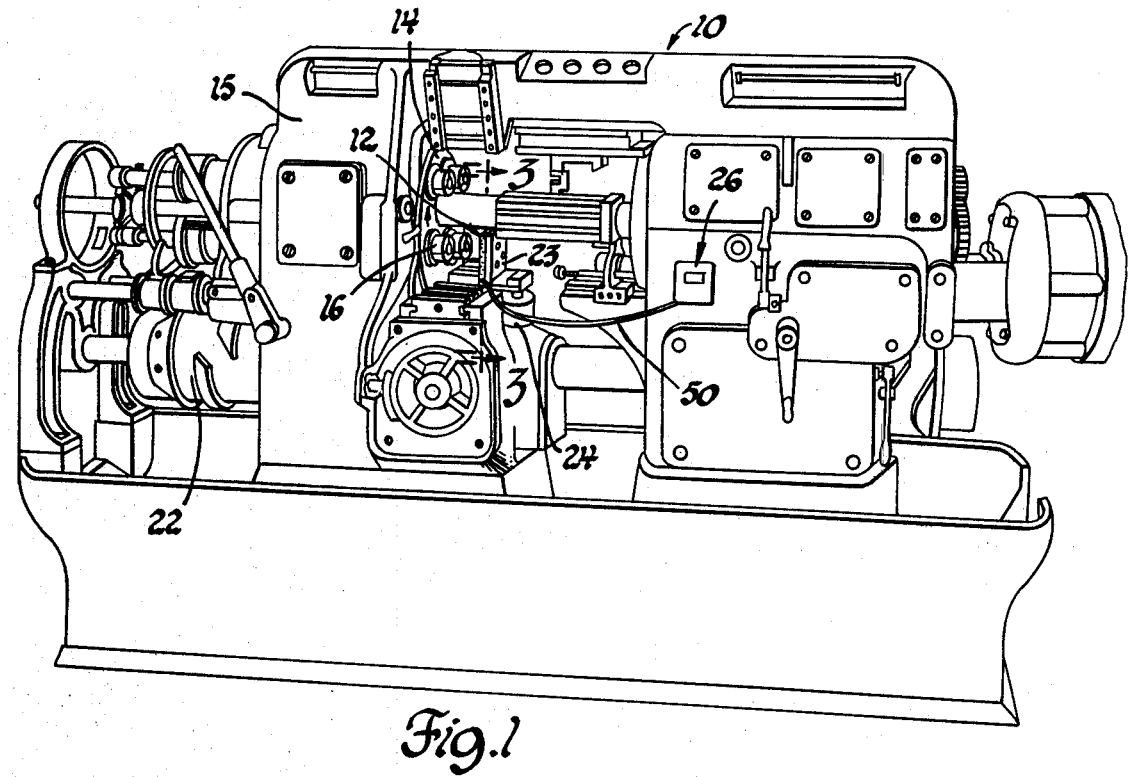
FIG. 1 is a three-dimensional side view of a multiple spindle automatic screw machine embodying a part counter according to the present invention.

The present invention is adapted for use in automatic metal working machines having a stock feed stop such as the multiple spindle automatic screw machine 10 shown in FIG. 1. Apart from modifications of its stock feed stop 12 as will be described in detail, the machine is otherwise conventional and of the type disclosed in U.S. Pat. No. 2,033,490 which is hereby incorporated by reference and to which reference may be made for a more detailed understanding of the machine beyond that now to be described. For purposes of understanding the invention, it is sufficient to know that in the multiple spindle automatic screw machine 10 there is an indexable spindle carrier 14 which is mounted on the machine's frame 15 and is indexable in the direction of the arrow indicated in FIGS. 1 and 2. A plurality of work spindles 16, in this case four, are rotatably supported by the spindle carrier at equidistant locations from each other and from the spindle axis. Each of the work spindles 16 releasably holds and revolves a bar 18 of metal stock to permit the machining thereof into a number of parts of prescribed design and inherently the bars are electrically grounded to the machine frame 15.

Each of the work spindles automatically releases its grip on the bar 18 it has been holding when indexed to a position opposite the work feed stop 12 and stock feed means including a drum 22 automatically advances the bar of stock in this spindle to engage the stop. The work feed stop 12 is mounted on an arm 23 of a positioning mechanism 24 which is mounted on the machine frame 15 and operates to position the stop opposite the end of each bar as the carrier indexes it to this position preliminary to the first machining operation to be performed thereon. After the bar engages the stop 12, its spindle then grasps it again and the stock stop is retracted to provide access for machining of a part from the end of the bar at this location.

Figure 2:
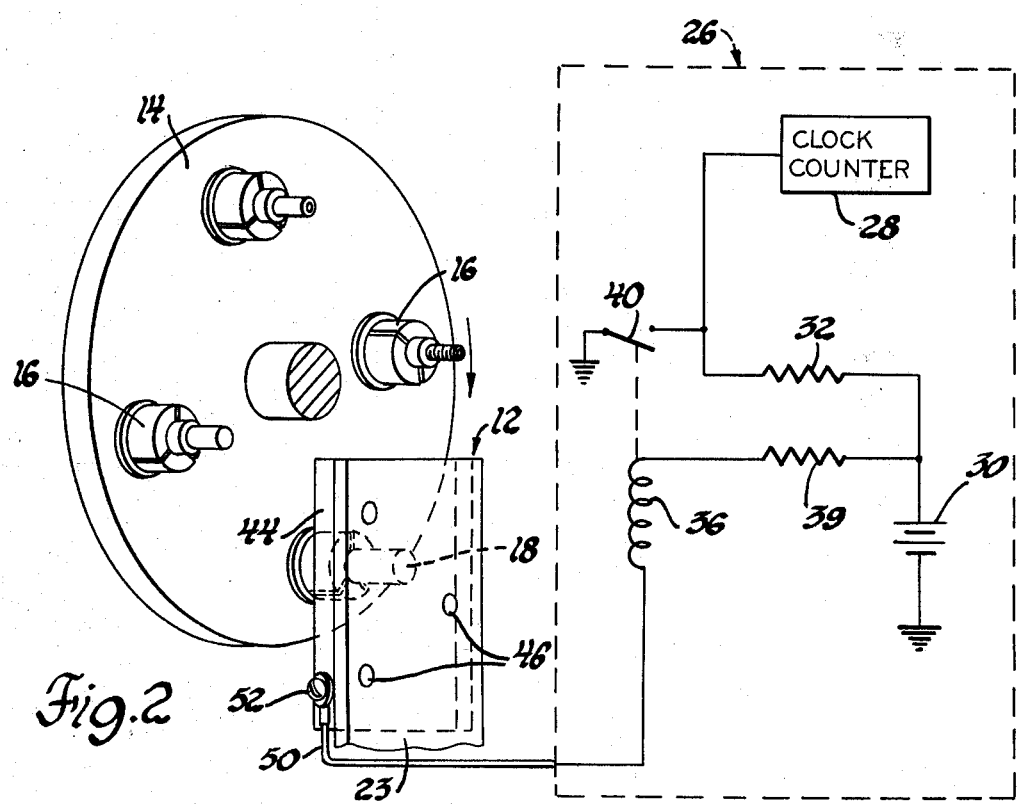
FIG. 2 is an enlarged view of the spindle carrier and stock feed stop in FIG. 1 and includes a schematic of the part counter circuit.
Figure 5:
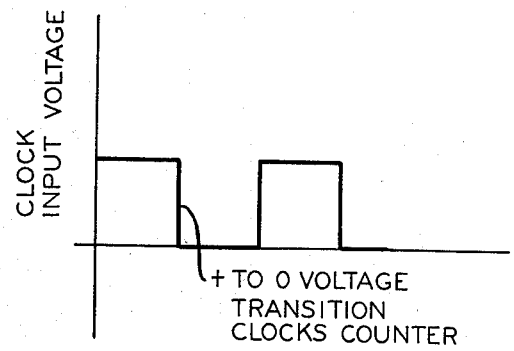
FIG. 5 is a diagram of the operating characteristics of the clock counter in FIG. 2.

The part counter according to the present invention counts the parts being machined by effecting a count preliminary to the actual machining thereof by simple, inexpensive modification of the conventional stock feed stop and the addition of a part counter unit 26 which can be secured directly to the machine frame 15 as shown in FIG. 1 or located remotely at a machine monitoring station. The unit 26 includes a clock counter 28 of conventional type which clocks on a positive to zero voltage transition as shown in FIG. 5. As shown in FIG. 2, power is made available to the clock counter from a grounded DC power supply 30 through a current limiting resistor 32. The circuit further includes a relay having a coil 36 which is connected through a second current limiting resistor 39 to the power supply 30. The coil 36 when energized operates its switch 40 which has one terminal grounded and its other terminal connected through resistor 32 to the power supply. Thus, when the relay switch 40 is closed, the power supply is grounded so that the clock counter 28 then effects a count and will continue to do so as the switch 40 is opened and closed repeatedly. Energization of the coil 36 to operate the switch 40 and thus effect a part count is accomplished by connecting the coil 36 to a metal stock feed stop plate 42 which is rigidly insulated from the machine frame 15 so that the power supply is grounded each time a bar of stock engages the stop.

Figure 3:
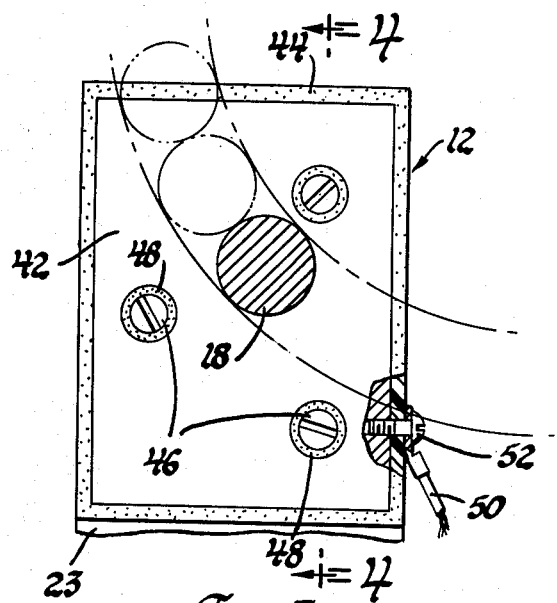
FIG. 3 is a view taken along the line 3—3 in FIG. 1 showing a bar of stock engaging the stock feed stop.
Figure 4:
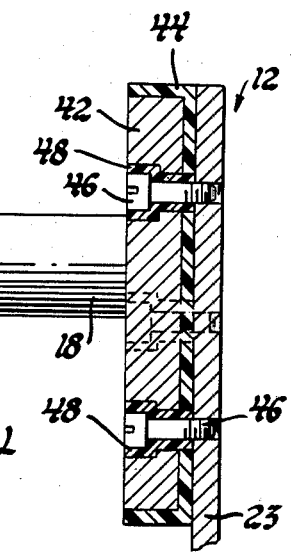
FIG. 4 is a view taken along the line 4—4 in FIG. 3.

This is accomplished with the provision of an insulation cup 44 of rigid, non-conductive material which fits against the arm 23 and insulates the back side of the stop plate 42 therefrom and in addition extends all about the edge of the stop plate so as to prevent accidental grounding by metal chips. The plate 42 is secured to the arm 23 by screws 46 which are prevented from grounding the plate to the machine by inserts 48 of rigid, non-conductive material which surround the screws where they fit within and would otherwise contact the plate. The bars of stock must be stopped precisely and the insulation material used in the construction of the cup 44 is selected to be non-brittle and substantially incompressible so that when the bar engages the stock feed stop plate the cup does not yield significantly and produce an inaccurate bar stop position for the subsequent machining operations. Polycarbonate is, for example, a satisfactory material having these properties. The coil 36 is connected to the insulated stock stop plate 42 by an insulated wire 50 that leads from the unit 26 to the stop. At the stop, the wire 50 is secured by a threaded fastener 52 through one side of the insulating cup 44 to one edge of the stop plate 42 as shown in FIGS. 2 and 3. Thus, when the end of the bars 18 contact the stop plate 42 the coil 36 is grounded to the machine thereby closing the switch 40 and causing a positive to zero voltage transition at the clock counter 28 to effect a part count.

Furthermore, with the stock feed stop plate insulated along its sides from flying chips, any accidental grounding thereby which would give a false count is effectively prevented. It will also be appreciated that while the circuit is shown as utilizing a relay to effect switching for voltage transition at the clock counter, other suitable switching devices may be utilized in lieu thereof having a groundable operating terminal which effects the desired switch operation each time the terminal is grounded. Furthermore, the invention is also adaptable to trigger shut down of the machine if it runs out of stock or is cycling without feeding stock since the clock counter will not be tripping. This event can be readily monitored to effect machine shut down or signal for supply of stock to the machine.

The above described embodiment is illustrative of the invention which may be modified within the scope of the appending claims.

The embodiments of the invention in which an exclusive property or privilege is claimed are defined as follows:

1. A multiple spindle automatic screw machine comprising a frame supporting indexable spindle carrier means, a plurality of work spindle means rotatably supported by said spindle carrier means for releasably holding and revolving bars of metal work stock to permit machining thereof into prescribed parts wherein the metal bars are thereby electrically grounded to said frame, work stock feed means mounted on said frame for advancing the metal bar in each said work spindle means at a fixed location relative to said carrier means, a metal stock feed stop plate mounted on said frame and having a front side for stopping advancement of each of the bars at said location preliminary to machining of a part therefrom, and part counter means for counting the number of parts machined comprising electrically operated counter means and circuit means for operating said counter means, said circuit means including switch means having a groundable operating terminal connected to said metal stock feed stop plate, said switch means operable to effect a count by said counter means each time said terminal is grounded, and rigid insulation means between the backside of the stop plate and said frame and also extending all about the edge of said stop plate for rigidly insulating said metal stock feed stop plate from said frame and also from metal chips directed toward the edge thereof whereby when the bar in each said work spindle means is stopped by the insulated metal stock feed stop plate there is also effected grounding of the terminal to the frame to operate said switch means to effect a part count.

2. A multiple spindle automatic screw machine comprising a frame supporting indexable spindle carrier means, a plurality of work spindle means rotatably supported by said spindle carrier means for releasably holding and revolving bars of metal work stock to permit machining thereof into prescribed parts wherein the metal bars are thereby electrically grounded to said frame, work stock feed means mounted on said frame for advancing the metal bar in each said work spindle means at a fixed location relative to said spindle carrier means, a metal stock feed stop plate mounted on said frame and having a front side for stopping advancement of each of the bars at said location preliminary to machining of a part therefrom, and part counter means for counting the number of parts machined comprising electrically operated counter means and circuit means for operating said counter means, said circuit means including a relay comprising a coil and switch operable to effect a count by said counter means each time said coil is grounded to operate the switch, said relay coil connected to said metal stock feed stop plate, and rigid insulation means between the backside of the stop plate and said frame and also extending all about the edge of said stop plate for rigidly insulating said metal stock feed stop plate from said frame and also from metal chips directed toward the edge thereof whereby when the bar in each said work spindle means is stopped by the insulated metal stock feed stop plate there is also effected grounding of the relay coil to operate the switch to effect a part count.

* * * * *